Dec. 5, 1944. H. C. MILLER ET AL 2,364,088
CORE DRILLING
Filed July 31, 1940 4 Sheets-Sheet 1

Harold C. Miller,
William B. Berwald,
David Ben Taliaferro, Jr.
Inventors,
Attorney.

Dec. 5, 1944.    H. C. MILLER ET AL    2,364,088
CORE DRILLING
Filed July 31, 1940    4 Sheets-Sheet 3

Section C-C

Harold C. Miller,
William B. Berwald,
David Ben Taliaferro, Jr.
Inventors.
by
Attorney.

Dec. 5, 1944.    H. C. MILLER ET AL    2,364,088
CORE DRILLING
Filed July 31, 1940    4 Sheets-Sheet 4

Section A-A
FIGURE 7.

Section B-B
FIGURE 8.

FIGURE 9ª

Harold C. Miller,
William B. Berwald,
David Ben Taliaferro, Jr.
Inventors,
by J. B. Morehead
Attorney.

Patented Dec. 5, 1944

2,364,088

UNITED STATES PATENT OFFICE 2,364,088

CORE DRILLING

Harold C. Miller, Oakland, Calif., and William B. Berwald, Tulsa, and David Ben Taliaferro, Jr., Bartlesville, Okla., assignors to The Government of the United States of America, as represented by the Secretary of the Interior Application July 31, 1940, Serial No. 348,736

25 Claims. (Cl. 255—72)

(Granted under the act of March 3, 1883, as amended April 30, 1928; 370 O. G. 757)

This invention described herein may be manufactured and used by or for the Government of the United States for governmental purposes without payment of any royalty thereon.

This invention relates to rotary core-drilling and aims generally to improve the same.

Examination of bottom-hole samples of oil gives valuable information concerning the amount of gas in solution in the oil within the reservoir and the resultant shrinkage of the oil when the gas is released. Producing characteristics of reservoirs may be determined by means of subsurface pressure and temperature gages and measurements made at the wellhead; however, unless reliable core analyses are available, these data have only limited use in any quantitative study of reserves. In such a study the quantity of oil, gas, and water contained in a unit volume of the reservoir formation is extremely important. Although reliable methods of analyzing cores have been developed and the data thus obtained are valuable, their applications become more limited as reservoirs at higher temperatures and pressures are discovered. This condition results almost entirely from the fact that in recovering a core from a formation of high pressure and temperature by present methods a large part of the fluid content of the core is lost or contaminated to an unknown extent. For a number of years most petroleum engineers have held that if this loss and contamination of the fluid content of a core could be substantially eliminated, the value of core analyses would be increased greatly.

The present invention aims generally to provide a device for obtaining this end, and thus has for one of its main objects the provision of a core-drilling tool, that will drill a continuous solid core of the formations below the bottom of drill holes and be a means for bringing a core specimen of the rock strata penetrated, to the surface of the ground under approximately the identical conditions of pressure and fluid saturation existing, at the time the core was being cut, in the rock formations from which the core originated.

A further object of the invention is to provide a core-drilling tool which will enable the taking of continuous solid cores of the rock formations below the bottom of drill holes with a minimum amount of contamination by mud, water, oil or other fluids used in drilling wells for oil, gas, and water.

Other objects of the invention will be pointed out hereinafter or will be apparent from the following description of the illustrative embodiment of the invention disclosed in the accompanying drawings, in which—

Figs. 1, 2 and 3 are vertical sections of the top, central and bottom parts, respectively, of the coring tool with the various parts shown in their relative positions at the time coring is started;

Figs. 4, 5 and 6 are cross sections of the top, central and bottom sections, respectively, of the tool on the line C—C (Fig. 7) as it appears after a core has been taken, the special valve 13 and the next valve 29 have been closed and the tool is ready to be brought to the surface;

Figs. 7 and 8 show sections on the lines A—A and B—B, respectively, at the time coring is started, while Fig. 7a is a detail of the ball operating stem; and Figs. 9 (a and b) and 10 (a and b) are details showing the preferred manner of spring-loading the valve operating latches and core-catchers, respectively.

Figures 2, 5:
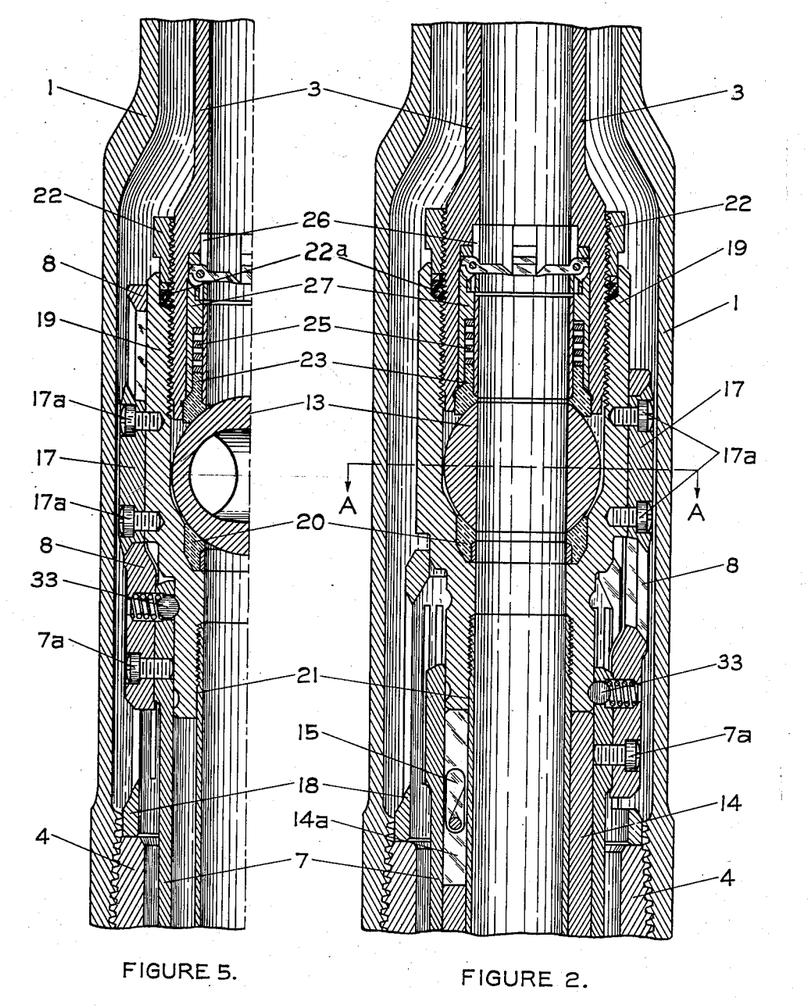
Figures 3, 6:
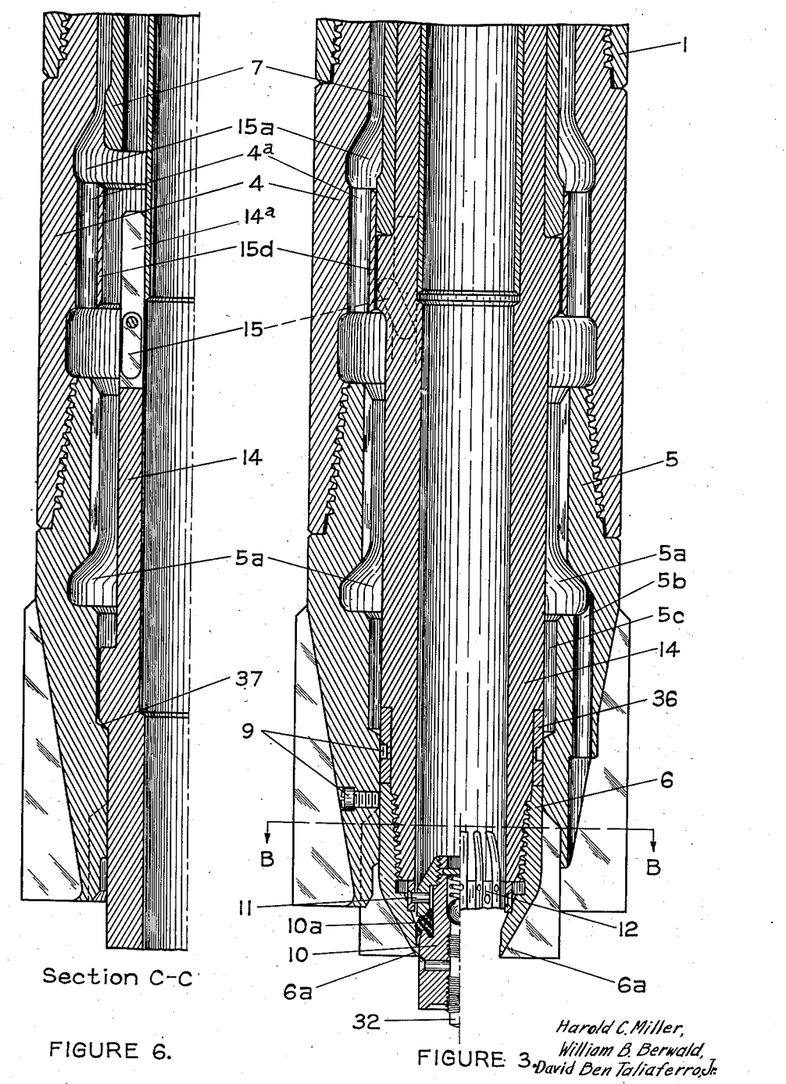

Referring in detail to the illustrative embodiment shown in the drawings, the tool therein shown comprises an outer barrel or drill stem 1, in which is suitably secured, as by shrinking in place and welding, a vent spider 2 (Fig. 1) through which fluid is led from the inner barrel 3, referred to hereinafter, to the outside of the outer barrel 1 or drill stem. A bit-body 4 (Figs. 3 and 6) connects outer barrel 1, to a cutter head 5 which cuts the hole in the earth strata to be sampled and drives ahead the core-forming shoe 6. In the form shown, the bit-body 4 accommodates and guides the moving parts of the valve-operating mechanism 7 and 8, referred to in more detail hereinafter. Any suitable means, such as the three shear rivets 9 (Fig. 3), are arranged to project into a groove, or holes, formed in a part 36 of the core shoe assembly, to hold the valve-operating mechanism 7 and 8 so that the spherical plug valve 13 (Figs. 2 and 5), referred to hereinafter is held in the open position. Rivets 9 shear when the bit or core shoe 6 strikes the bottom of the hole allowing free relative movements thereafter of the internal parts of the tool. Figure 3 shows rivets 9 already sheared.

In order to keep fluid in the inner barrel system when lowering the tool in the drill hole, a core-shoe plug 10 (Fig. 3), which may be made in any suitable manner, as by forming it of duralumin or other suitable material with a rubber, or other suitable flexible cap 10a and a steel rivet ring, is inserted into the opening in core shoe 6, and held in position by suitable means such as the six core-shoe-plug rivets 11 shown. Rivets 11 shear when plug 10 strikes the bottom of the drill hole. Plug 10 then floats above the core in the core barrel during core-cutting operations and keeps foreign material out of inner barrel 3, referred to hereinafter. The head ends of rivets 11 in the form shown are supported and held in any suitable manner, as by the lower core catcher 12, which may be a spring-type core-catcher for recovering the core below valve 13, referred to hereinafter.

Core-shoe stem 14 (Figs. 2, 3 and 6) acts as a guide for the core as well as providing a means for operating valve 13, referred to hereinafter. Spring loaded valve-operating latches 15 (Figs. 2, 3, 6, 9a and 9b) of which there are three in number, operate in their dotted line position shown in Fig. 3 to raise valve-operating mechanism 7 (Figs. 2, 3, 5 and 6), referred to hereinafter, to close valve 13 (Figs. 2 and 5), referred to hereinafter, after the core has been cut and the tool picked up and again lowered to cause core-shoe 6 to again bear against the bottom of the drill hole. Subsequent operation of valve 13, referred to hereinafter, is not possible because valve-operating latches 15 turn over in the clearance space 15a (Figs. 3 and 6) to the position shown in Fig. 6, and also because the spring loaded ball catch 33 (Figs. 2 and 5) on the valve operating rack 8 holds valve 13 closed. Valve-operating sleeve 7 (Figs. 2, 3, 5 and 6) serves to guide and align the core-receiving parts and carries valve-operating rack 8, a gear rack which operates with a gear 24 on valve stem 16 referred to hereinafter. Valve stop 17 determines the open and shut position of the valve 13, referred to hereinafter, and supports the gear rack 8 in mesh with the valve-operating gear 24. As shown in Figs. 2 and 5, a slotted sleeve 18 supports the inner barrel 3, referred to hereinafter, in a central position in outer barrel 1.

Valve body 19 (Figs. 2, 5 and 7) contains the lower seat 20, preferably made of celeron or like material, of core-barrel valve 13, referred to hereinafter. The valve body 19 in the preferred form, also supports core-guide sleeve 21 (Figs. 2, 3, 5 and 6) which bridges the gap in the core passage when the valve-operating mechanism is extended. Valve-body lock nut 22 (Figs. 2 and 5) locks valve body 19, after the tension on valve seat 20 and valve seat 23, referred to hereinafter, has been adjusted, and is provided with packing material 22a to insure against leakage of pressure from the sealed-up core through the threaded joint between members 3 and 19.

Valve 13 is preferably a spherical-type plug valve whose plug rotates between preloaded seats 20 and 23 made of any suitable material, such as celeron, the parts being well greased. Plug valve stem 16 (Fig. 7) is rotated in closing the valve 13, by suitable means such as the plug-valve operating gear 24 which meshes with the gear rack 8. Upper valve-seat spring 25 (Figs. 2 and 5) constitutes means for preloading valve seats 23 and 20.

Inner barrel 3 (Figs. 1, 2, 4 and 5) receives the core sample and near the lower end of inner barrel 3 (Figs. 2 and 5) we preferably provide a suitable core catcher, herein the spring-loaded dog-type core catcher 26 which is supported in core catcher supporting sleeve 27.

Figures 1, 4, 10, 10A:
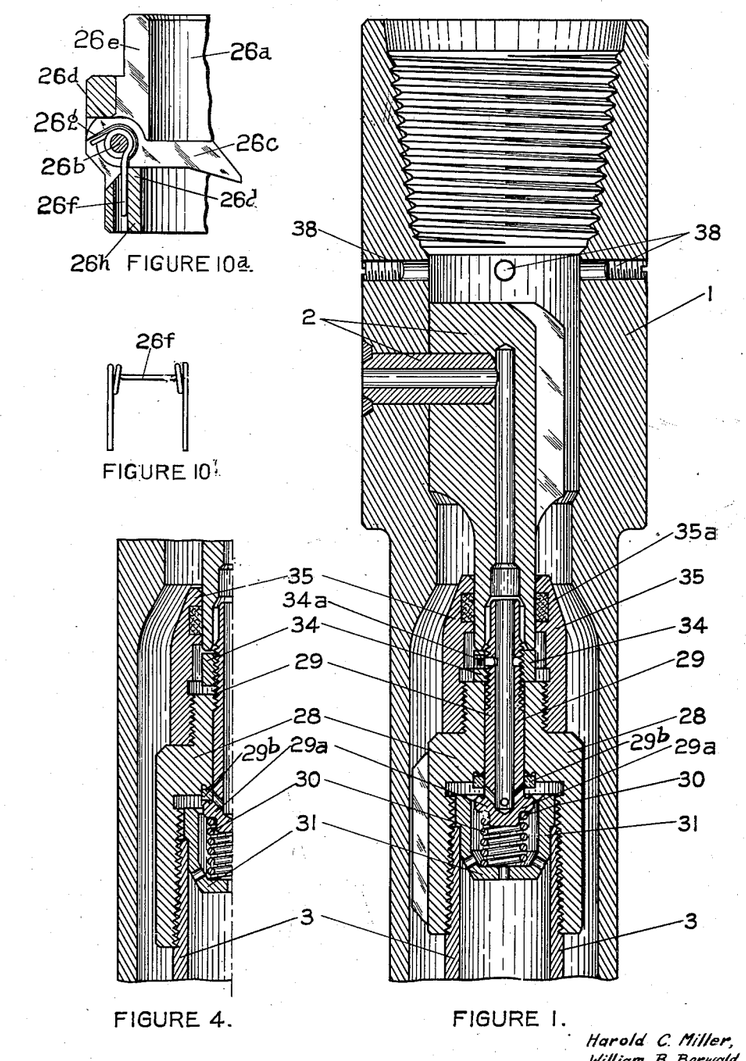

Details of a suitable form of this core catcher 26 are shown in Figs. 10a and 10b, from which it will be seen that its body 26a is provided in the form shown with a pintle 26b on which the catcher-dog 26c is pivoted to be swung, by the core rising against it, from its catching position shown (in which it abuts limiting shoulders 26d) to a vertical position in which it lies within the housing slots 26e. When the core starts to drop, however, the tensioning spring 26f causes the point of the dog 26c to engage with the core and urges the dog back into the core-catching position shown. The spring 26f in the form shown is housed in recesses in the sides of the dog 26c, embraces the pintle 26b, and is tensioned between the shoulder 26g and the wall 26h.

In the form shown, the upper valve seat spring 25 is held in place by the core catcher supporting sleeve 27.

Inner barrel 3 is fitted at its upper end (Figs. 1 and 4) with a suitable valved closure, as a barrel-type cap 28 with a seat for vent valve 29 through which the fluid above the core in inner barrel 3 escapes to the outside of the outer barrel 1. Vent valve 29 is preloaded by means of vent valve spring 30 and is fitted with a strainer 31 to prevent particles of sand from getting under this valve thus preventing its proper seating.

Figures 7, 7A, 8, 9A, 9B:
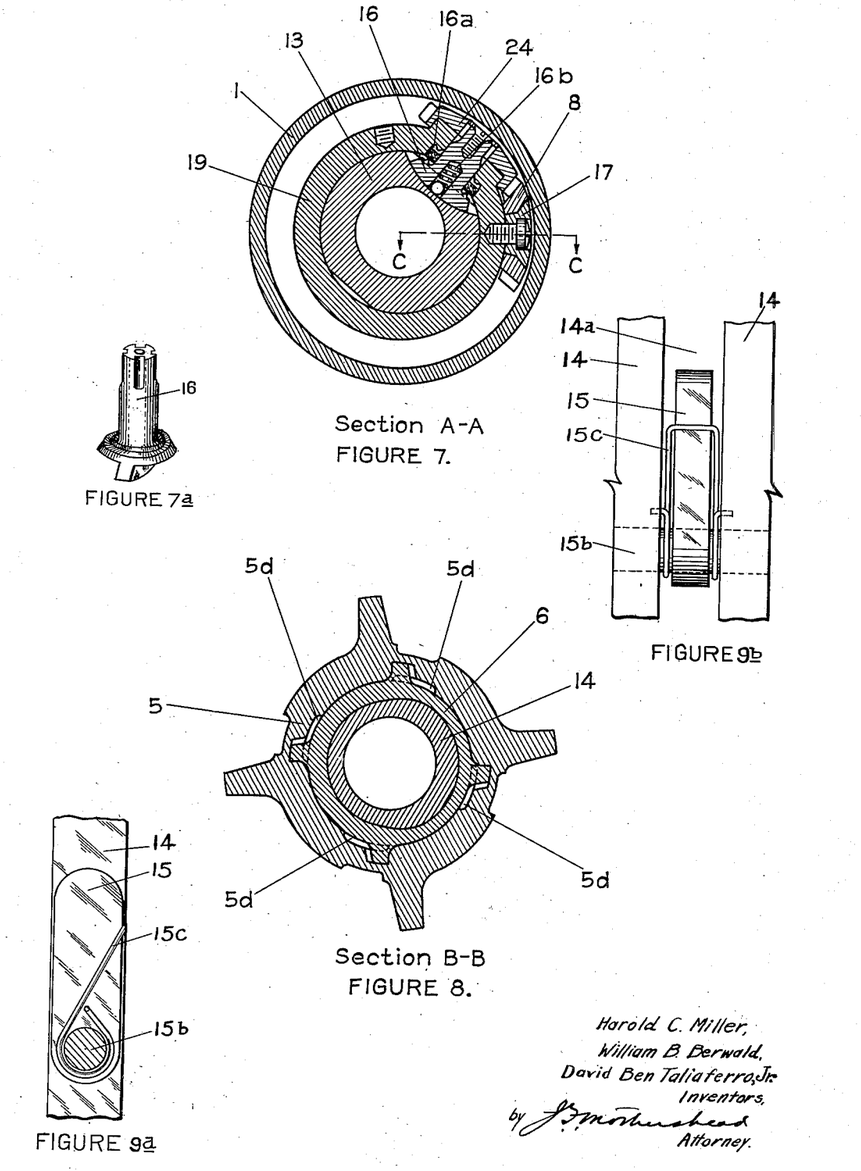

While any suitable means may be employed for spring-loading the valve-operating latches 15, a preferred arrangement is show in Figs. 9a and 9b. In this form the latches 15 are pivoted in the slots 14a (Figs. 2, 6, 9a and 9b) formed in the core-shoe stem 14, as by pintles 15b, and when turned upwardly into the position shown in Figs. 2, 9a and 9b, bear against the bridging portion of the loading springs 15c, which in the form shown, are continuously retained in the slots 14a by embracing the pintles 15b and having their ends out-turned and engaged in apertures in the sides of the slots 14a. The springs 15c thus urge the latch-members 15 outwardly into the position shown in dotted lines in Fig. 3, when the core-shoe stem 14 slides downwardly enough for the latches 15 to drop below the sleeve 7.

As shown in Fig. 3, the wall 15d, here shown as carried by the bit-body 4, stops the outward turning of the latches 15 and causes them to remain in position to engage the lower end of valve-operating sleeve 7 as the core-shoe stem 14 slides upwardly within the outer casing, until after completion of sufficient motion to close the valve 13, the latch members 15 enter the turning spaces 15a, and turn over into the inoperative position shown in Fig. 6, before the full weight of the drill pipe bears upon the valve stop 17.

In assembling the tool shown in the accompanying drawings, the vent strainer 31 is inserted in the top end of inner barrel 3. Vent valve spring 30 next is placed in the strainer followed by vent valve 29. The inner barrel then is capped by the barrel-type cap 28.

Core catcher 26 is inserted in the lower end of inner barrel 3, and is followed by the core catcher supporting sleeve 27. Upper valve seat spring 25 next is inserted, followed by upper valve seat 23. These parts are covered with grease before inserting them in the inner barrel. Valve body lock nut 22 next is screwed on to the inner barrel.

Lower valve seat 20 is pressed in place in valve body 19, at the time the seat is machined. Plug valve stem 16 also is assembled during the manufacture of the tool, and the spherical plug valve 13 is inserted in the valve body with grease packed around the plug.

The assembled valve 13, then is made up on the lower end of inner barrel 3, adjusted for proper tightness on the ball-shape valve and the adjustment locked by lock nut 22. Valve operating rack 8 with the valve stop, shown as a dove-tail slide member 17, then is assembled to the valve body with bolts 17a (Figs. 2 and 5). When assembling the valve operating gear 24, full open position of the valve is indexed with the rack in its farthest down position. In the preferred form slight adjustments in the farthest down position of the rack can be made by providing an odd number of teeth on the valve-operating rack 8 and an even number of splines on the stem shaft 16 of the plug valve 13. The valve operating gear 24 in the form shown is locked on the valve stem 16 with a washer and screw.

Core guide sleeve 21 (Figs. 2 and 5) is made up in the lower end of the valve body 19, and valve-operating sleeve 7 is secured, as by screws 7a (Fig. 2), to the valve-operating rack 8.

Inner barrel 3, then is inserted into outer barrel 1, and followed by sliding slotted sleeve 18 (Figs. 2 and 5) into place. Next, as shown in Fig. 3, core-shoe stem 14 (Figs. 2, 3, 5 and 6), is inserted through cutter head 5; lower core catcher 12 is suitably assembled onto the core shoe plug 10 as with rivets 11; and the plug and core catcher assembly is inserted into the core shoe bore and retained therein by the core shoe 6, which is made up onto the core shoe stem 14, which includes the wear-ring 36 hereinafter described.

Bit body 4, then is made up onto cutter head 5.

The spring loaded valve operating latches 15 then are lifted to the position shown in Fig. 2, and the core shoe stem 14 is slid up into the valve-operating sleeve 7 with the latches pointing upward. Following this operation, the bit-body 4 is made up into the outer barrel 1 and while this is being done, the assembly of the core shoe stem 14 and core shoe 6 is maintained in an upwardly displaced position in the core cutter 5 to prevent the latches 15 coming below the valve operating sleeve 7.

Next, the assembly terminating in the core shoe 6 is pulled downwardly through the head until the holes or groove carried by this assembly, herein formed in the wear-ring 36, can be indexed with the rivet holes and the headless rivets 9 inserted. The core barrel then is completely assembled and ready for use. In the form shown (Fig. 3), the groove (or holes) to receive the ends of the rivets 9 is formed in a replaceable wear-ring 36, as the edges of this groove are exposed to the drilling mud in the ducts 5c and become abraded.

To prevent the inner barrel 3 and core shoe stem 14 from filling with drilling fluid and cuttings when the tool is lowered into the well these parts are filled with a suitable noncompressible fluid. This is accomplished by placing the tool in such a position that the core shoe plug 10 is in the highest position and removing the core shoe filling plug 32 (Fig. 3). A filling nipple is connected to the core shoe plug 10 through which the interior of the tool is filled, the air escaping past the rubber core shoe packing ring 10a.

After filling, the core barrel is attached to the lower end of the drill stem and lowered almost to the bottom of the drill hole with the ball valve 13 in the open position and the core shoe 6 supported up close to the main cutter head 5 by rivets 9. While suspended in the drill hole a few feet off bottom the fluid circulating pumps on the derrick floor are started and the core barrel slowly washed to bottom. When bottom of the hole is reached some or all of the weight of the drill stem is placed on the core barrel. Core shoe plug 10 extends, in the form shown, about 1½ inches ahead of the core shoe and is held there by the six rivets 11 (which may conveniently be of 3/16" diameter) so that when the plug strikes bottom, rivets 9 shear off, freeing the inner barrel, and rivets 11 shear off, releasing the scavenging plug 10.

By rotating the drill stem and thereby the cutter head 5 and the core shoe 6 (which is driven by its engagement with slots in the bore of the main cutter head 5 as shown in Figs. 3 and 8), a core of the formations penetrated is cut out. While the core is being cut flushing fluid is directed from the drill stem through the upper end of the body 1, past the spider 2, and through the spaces between the outer and inner assemblies to the latch turning space 15a, thence through the apertures 4a behind the wall 15d (Figs. 3 and 6) to flushing fluid chamber 5a, from which the fluid is distributed through ducts 5b, to the blades of the cutter head 5 and through ducts 5c and small slots 5d (Fig. 8) to flush the core shoe 6. The body of the core shoe 6 extends to bottom at 6a (Fig. 3) between the blades to minimize contamination and washing of the core. After rivets 9 are sheared, the core shoe stem 14 raises the inner barrel 3 until the vent valve 29 (Figs. 1 and 4) is opened at the top of the inner barrel 3 by contact with the vent spider 2.

In the form shown, the valve-cap 28 (Figs. 1 and 4) is perforated for the passage through it of the hollow vent-valve stem 29 which has lateral inlet openings at its inner ends underlying its head portion 29a. The head-portion 29a and the valve cap 28 are provided with opposing annular knife-edge seats which bear upon the interposed annular vent-valve seat or washer 29b under the influence of the spring 31, which is compressed against strainer 30 when the valve is opened.

The vent-valve seat 29b may be formed of any suitable material but is preferably formed of a central core of celeron covered on its upper and lower sides with thin pieces of rubber. With a low differential pressure across the vent valve, the spring 30 presses the knife edges of the valve 29 and the inner barrel cap 28 against the rubber covering of the valve seat 29b and effects a seal. As the differential increases as the tool is brought to the surface of the ground, the knife edges cut through the rubber coatings of the removable and replaceable valve-seat 29b and come in contact with the harder celeron, effecting a seal for higher pressures.

The outer end of the valve cap 28 in the form shown, is provided with a sleeve 35, herein threadedly engaged therewith, which carries a packing washer 35a and thus provides a sliding fit with the lower or neck-end of the vent spider 2, and prevent the accumulation of sand from the drilling mud around the vent valve 29.

In the preferred form shown, the valve stem 29 has suitably mounted thereon an adjustable nut or collar 34 (Figs. 1 and 4), herein threadedly engaged to the stem 29 and provided with a set-screw 34a, which, when the valve is closed during insertion of the device into the well, stands away from the valve cap 28, as shown in Fig. 4.

When the tool is rested on the well-bottom just before the core-cutting operation, moving the lower inner assembly 6–14–15 (Figs. 2 and 3) upwardly, pushing ahead of it the upper inner assembly 19–22–3–28–35 (Figs. 1 and 2), and causing the latter to slide upwardly on the neck of the vent spider 2 (Fig. 1), the top of the collar 34 abuts the end of the vent spider neck, by which the valve 29 is pushed downwardly until the bottom of the collar 34 abuts the top of the valve-cap 28, avoiding undue strain on the valve parts, and maintaining the vent valve 29 open during cutting of the core, by an amount predetermined by the position of the collar 34.

When a core sufficiently long to fill the core barrel up to the vent valve 29, less the length of the core plug 10 (which has preceded the section of cut core into the barrel, and scavenged the barrel in so doing), has been cut, then the core barrel is raised one or two feet from the bottom of the drill hole and suspended there for about five minutes while fluid circulation is being maintained down the drill stem and up the annular space between the drill stem and the walls of the bore hole. By circulating fluid the hole is cleaned of cuttings which otherwise might settle to the bottom of the hole.

Raising the core barrel off bottom allows the core shoe 6 and the core-shoe stem 14 with the core contained therein to drop sufficiently, herein about 8 inches, so that the core-shoe stem 14 will seat in the cutter-head bore as indicated at 37 (Fig. 6). The core breaks at or near the core catcher 26 (Figs. 2 and 5) and drops through the ball valve 13. The latches 15 drop below the valve operating sleeve 7 and spring out against the wall 15d within the bit body 4, as shown in dotted lines in Fig. 3.

The core barrel then again is lowered to the bottom of the hole and weight of the drill stem placed upon it. When the core shoe 6 strikes the bottom of the hole, the valve-operating sleeve 7 is engaged by the latches 15, and moves with the assembly 6–14–15 relative to the upper assembly 19–22–3. Because of this relative movement the valve-operating rack 8, carried by the sleeve 7 coacts with the valve operating gear 24 to turn the ball valve 13 one quarter turn and thereby close this valve. When the rack 8 strikes the valve stop 17, the inner barrel 3 is raised enough to allow the latches 15 to turn over into the counterbore or turning space 15a of the core bit-body 4 (Figs. 3 and 6), thus releasing the valve-operating sleeve 7 from any thrust of the latches 15. After the latches 15 are turned over they assume the position shown in Fig. 6. Subsequent raising and lowering of the drill stem has no effect on the ball valve which is tightly locked against reopening by friction and by the operation of the spring loaded ball catch 33. The weight of the inner barrel assembly 19–22–3–28–35 and the action of the vent-valve spring 30 serve to cause this inner barrel assembly to drop down on the slotted sleeve 18 (Figs. 2 and 5) and allows the vent valve 29 to be closed by the spring 30.

The core barrel with the core specimen under formation pressure securely locked above the ball valve against release of pressure and loss of fluid then is withdrawn from the drill hole, unscrewed from the drill stem and the bit-body 4 is removed from the outer barrel 1. Next, the inner barrel assembly is removed and (if necessary) the valve body 19 may be tightened against the ball valve 13, (the lock nut 22 being backed-off very slightly during this operation, and then being re-tightened firmly, using care not to allow any escape of pressure). As shown in Fig. 7, leakage around the ball-valve stem 16 is prevented by providing it with a rubber coated celeron washer packing 16a, engaged by knife-edges in a manner similar to that employed for valve 29. The stem 16 in the form shown engages with its inner end a spline-slot in the ball-valve proper 13, so that turning of the stem by means of the gear 24 splined to its outer end turns the valve to close it. The stem 16 is continuously urged outwardly by the spring means 16b to bring the knife edges to bear against the packing 16a forming a seal that tightens with the development of differential pressure.

A nut or the threaded collar 34 is screwed onto the vent valve thread and tightened against the upper end of the valve cap 28 (Figs. 1 and 4) to hold the vent valve 29 closed. Then the valve-operating gear, valve stop and gear-rack screws 17a are removed followed by the unscrewing of the core-guide sleeve 21. The inner upper barrel assembly with its core specimen under formation pressure is then ready to be transported to the laboratory. The core barrel can then be cleaned and another inner barrel assembly installed to take the place of the assembly temporarily in the laboratory, if additional cores are to be taken immediately.

When the upper inner assembly 19–13–22–28–29 and contained sealed section of core is being shipped to the laboratory, the extended cap portion 35 may be screwed onto the member 28 to protect the valve stem 29, or may be replaced with an ordinary closed cap for this purpose. On reaching the laboratory this cap 35, or the substitute therefor, is removed, the collar 34 is loosened or removed, and the cap 35 is replaced with a cap or laboratory head having threaded through its top a suitably packed push rod, which can be screwed inwardly to depress the valve stem 29 and release the pressure from the core into the laboratory head. The released fluids can then be conducted from the laboratory head through suitable valved ducts formed therein. Such an arrangement is shown in Fig. 4 of Bureau of Mines Report of Investigation (R. I. 3481), dated November 1939, which contains a description of the present invention published within two years preceding this application, and to which reference is hereby made for various theoretical and technical discussions, details of designs such as suitable sizes for parts, preferred field and laboratory practices, and other features of the present invention, and which may be consulted to supplement in detail, the present description thereof. The present invention is not limited to the forms disclosed herein, and in R. I. 3481, for purposes of illustrating the same.

Thus, in the form shown, the upper end of the sleeve 14 of the inner-lower-assembly 6–14–15 is the part of that assembly which raises the inner-upper-assembly 19–22–3–28–29 to effect opening of the vent valve 29, but the invention is not limited, in its broader aspects, to the arrangement of this particular portion of the assembly to perform this function, but contemplates any arrangement including means permitting venting of the barrel during core cutting and effecting sealing of the barrel at both ends of a section of core when the coring operation has been completed.

Similarly, in the form shown, the device is provided with mud passages throughout its body commencing with the passages through spider 2 and terminating with passages 5b and 5c adjacent the cutter blades, so that the tool may be employed with ordinary drilling mud. However, the present invention is not limited to such arrangement, but contemplates also the use of special heavy drilling fluids in the bottom of the drill hole, selected to avoid contamination of the strata from which the core is to be cut. For this purpose the heavy drilling fluid should preferably be immiscible with the contents of the strata, and should preferably have a rather high surface tension, as well as a specific gravity greater than that of the strata material being drilled. It should also be inert and not a solvent for constituents of the strata. Fluids which can be thus used for certain purposes in certain types of strata are methylene iodide ($CH_2I_2$), specific gravity 3.32 (compared with rock cuttings, specific gravity 2.5); mercury, specific gravity 13.6, pentachlorethane ($CCl_3CHCl_2$), specific gravity 1.83, and tetrabromethane ($C_2H_2Br_4$), specific gravity 2.97, low melting alloys such as "Cerrobend" (m. p. 160° F.) and the like.

The present invention contemplates the use of such heavy drilling fluid in the bottom of the drill-hole and with such employment any strata contaminated by the ordinary drilling mud may be cut away with the ordinary drill head after the heavy fluid has been placed in the hole Such cuttings will rise by buoyancy through the heavy fluid and can be washed up, by the circulation of regular drilling mud to a point above the surface of the heavy fluid. In this preliminary cutting, the ordinary drill may simply be operated slowly in the body of heavy fluid, without circulation of mud, and the ordinary rig may then be raised to a position slightly above the heavy fluid level, and circulation of mud initiated to clear away the cuttings.

Thereafter the core-cutter of the present invention may be connected and operated in the heavy non-contaminating fluid to cut a core, and in this case mud may be continuously circulated to a point above the heavy fluid. In this connection, the tool shown may be employed, arranged in any suitable manner to deliver the drilling-mud laterally at a near the top level of the heavy fluid, without forcing drilling mud down to the level of the strata being cut. For this purpose, the casing I may be apertured as removing the conventional plugs from apertures 38 (Fig. 1) allowing the casing to fill with heavy fluid to a level nearly equal to that outside the casing, and the differences in specific gravity relied upon to cause the drilling mud to pass outwardly through apertures 38. If a more positive separation of the fluids is desired, the end of the drill pipe (not shown) may be plugged at or above its connection with the casing I (Fig. 1) and the mud may be circulated down the drill pipe to such closure and through lateral openings thereabove (similar to openings 38) from the drill pipe to the hole at or near the heavy fluid level. Alternatively, if desired, the openings around spider 2 (Fig. 1) may be closed, converting this spider into a solid plug, and the drilling mud may be delivered laterally through openings such as 38 formed in the casing I above the level of the closure plug formed by conversion of the spider 2. In such case it is contemplated that suitable modifications may be made in the arrangement of the drilling fluid ducts within the tool to avoid entertainment of mud therein as the tool is lowered to cutting position.

In summary, it is apparent from the foregoing description that the present invention provides a drill-hole sampler, comprising a core cutter having a core receiving chamber associated therewith, means for sealing the upper end of the core-receiving chamber before withdrawal of the tool from the drill-hole, and means operable to seal the lower end of the core receiving chamber before withdrawal of the sampler from the drill hole, thereby to retain, with respect to the core-section between the two sealing means, the conditions existing at the locus of cutting and sealing of the core section. In order to define concisely the important characteristic that the sample is sealed fluid tight against escape or drop of pressure of any fluid sealed up under the formation conditions, the phase "hermetically sealed" is used in this sense in certain of the following claims.

It is further apparent that in the preferred form the lower-end-sealing means is operable by remote control, as by vertical reciprocation of the tool relative to the bottom of the drill-hole; that the upper-end-sealing means is also so operable in the generic sense, that the inner core-receiving barrel is free to remain non-rotating despite rotation of the outer barrel, and that the invention comprises various novel combinations, sub-combinations and details of construction, which may be, and preferably, are severally or in association, employed in the preferred modes of practicing the more general inventive concept.

In addition, the invention comprises further features, as the method of cutting and sealing a core with a special drilling fluid non-miscible with the core contents, contributing to the improvement of the art.

Thus the above described embodiments of this invention are to be considered as illustrative, but not restrictive, of the more general concepts disclosed and hereinafter claimed.

We claim as our invention:

1. A drill hole sampler, comprising a core-cutter adapted to cut a cylindrical core of a predetermined diameter, an inner core-receiving chamber associated therewith of a diameter to just freely receive the cut core and adapted to be substantially filled thereby to the exclusion of any substantial volume of drilling mud, means carried by said inner core receiving chamber and operable to hermetically seal its upper end before withdrawal of the sampler from the drill-hole, and means carried by said inner core-receiving chamber and operable to hermetically seal its lower end before withdrawal of the sampler from the drill-hole.

2. A drill hole sampler, comprising a core-cutter adapted to cut a cylindrical core of predetermined diameter, an inner core-receiving chamber associated therewith of a diameter to just freely receive the cut core and adapted to be substantially filled thereby to the exclusion of any substantial volume of drilling mud, means operable to hermetically seal the upper end of said core-filled inner chamber before withdrawal of the sampler from the drill-hole, and means carried by said core-receiving chamber and positively operable by vertical reciprocation of said sampler relative to the bottom of the drill hole to hermetically seal the lower end of said core-filled inner chamber before withdrawal of the sampler from the drill-hole.

3. A drill-hole sampler, comprising a rotary core-cutter for attachment to a drill-pipe adapted to cut a cylindrical core of a predetermined diameter, an inner core-receiving barrel associated therewith and freely rotatable relative thereto for receiving the core as it is cut, said barrel being of a diameter to just freely receive the cut core and adapted to be substantially filled thereby to the exclusion of any substantial volume of drilling mud, and said inner core-receiving barrel comprising mechanical means operable to hermetically seal a section of said barrel substantially filled with cut-core before withdrawal of the sampler from the drill-hole; thereby to independently retain, in said sealed section of said inner barrel and in the core-section filling it, the conditions existing at the locus of cutting and sealing of said core section.

4. A drill hole sampler, comprising an outer casing adapted for attachment to a drill-pipe, a main cutter carried thereby; a core cutter reciprocable through said main cutter and drivably associated with said outer-casing, said core cutter adapted to cut a cylindrical core of a predetermined diameter; an inner barrel within said casing and with respect to which said casing is rotatable, said inner barrel comprising a core guide telescoping with said core cutter for receiving the core cut thereby, and said inner barrel comprising a core retaining section for receiving core from said core guide, said core retaining section being of a diameter to just freely receive the core and adapted to be substantially filled thereby to the exclusion of any substantial volume of drilling mud, and said core retaining section having a vent valve at its upper end, a cut-off valve at its lower end, and a core breaker above said cut-off valve; said sampler comprising means for maintaining said valves open during cutting of a core, and means responsive to reciprocation of said core-cutter relative to said casing for closing said valves.

5. A drill hole sampler, comprising an outer casing adapted for attachment to a drill-pipe, a main cutter carried thereby; a core cutter reciprocable through said main cutter and drivably associated with said outer-casing, said core cutter adapted to cut a cylindrical core of a predetermined diameter; an inner barrel within said casing and with respect to which said casing is rotatable, said inner barrel comprising a core guide telescoping with said core cutter for receiving the core cut thereby, and said inner barrel comprising a core retaining section for receiving core from said core guide, said core retaining section being of a diameter to just freely receive the core and adapted to be substantially filled thereby to the exclusion of any substantial volume of drilling mud and said core retaining section having a vent valve at its upper end, a cut-off valve at its lower end and a core breaker above said cut-off valve; said sampler comprising means for maintaining said valves open during cutting of a core, and means responsive to relative reciprocation of said core-cutter and casing for withdrawing the section of the core below said core-breaker from said cut-off valve, and for thereafter closing said valves while maintaining withdrawn said withdrawn core section.

6. In a drill-hole sampler, a core-cutter adapted to cut a cylindrical core of a predetermined diameter, a barrel adapted to receive a section of core as it is cut, said barrel having an inner chamber of a diameter to just freely receive the cut core and adapted to be substantially filled thereby to the exclusion of any substantial volume of drilling mud, and said barrel comprising means operable by the core-cutter for hermetically sealing both ends of said core-filled inner chamber before withdrawal of the sampler from the drill hole; thereby to independently retain, with respect to said sealed inner chamber and the section of cut-bore substantially filling the same, the conditions existing at the locus of cutting and sealing thereof.

7. In a drill-hole sampler, an outer-casing adapted for connection to a drill-pipe, a core-cutter carried thereby adapted to cut a cylindrical core of a predetermined diameter, an inner core-barrel within said casing adapted to receive a section of cut-core, said core barrel comprising a core retaining section of a diameter to just freely receive the cut core and adapted to be substantially filled thereby to the exclusion of any substantial volume of drilling mud, said core-retaining section having valves at its upper and lower ends forming a single unit with it, and means operable by manipulation of the drill-pipe for closing said upper and lower valves to hermetically seal a section of core in said inner core-barrel before withdrawal of said core barrel from the drill hole.

8. A device according to claim 7, said lower valve being a rotary plug valve, and the closing means therefor comprising a rack and gear operable to rotate said valve to closed position on relative movement of the core-cutter and core barrel.

9. A drill-hole sampler, comprising a casing adapted for attachment to a drill-pipe, a core-cutter, vertically movable relative to said casing and adapted to cut a cylindrical core of a predetermined diameter, an inner core-barrel aligned with said core cutter and of a diameter to just freely receive the cut core and adapted to be substantially filled thereby to the exclusion of any substantial volume of drilling mud, means for sealing up said inner barrel, including a rotary plug valve carried by and forming the lower end of said inner barrel, and means operable by relative vertical movement of said casing and core cutter for removing from said rotary plug valve that portion of the section of cut core lying therein and for thereafter rotating said valve and hermetically sealing in said inner barrel the un-withdrawn portion of said cut core.

10. A drill hole sampler comprising an outer casing adapted for attachment to a drill-pipe, a core-barrel having limited vertical movement within the upper portion of said casing, a vent-valve in the upper end of said core-barrel opened when the core barrel is raised and closed when it is lowered, said core barrel having a rotary plug-valve in its lower end and a core-breaker and catcher thereabove, a core-cutter reciprocable through the lower end of said casing aligned to deliver the cut core through said plug-valve to said core-barrel and functioning on outward reciprocal movement to remove the section of core below said core-breaker from said plug valve, means operated by said core-cutter to raise said core-barrel and open said vent-valve during core-cutting, a pinion carried by said plug-valve, a rack for turning said pinion to close said plug-valve, a sleeve carrying said rack, and means operable by reciprocation of said core-cutter for vertically moving said sleeve and rack to close said plug valve after the aforesaid removal of the core from said plug valve.

11. A drill-hole sampler according to claim 10, said last named means comprising dogs carried by said core-cutter and adapted to assume a position underlying said sleeve when said core-cutter is in extended postion, and to raise said sleeve for closing said valve during the initial portion of its movement from extended position.

12. A drill-hole sampler comprising an inner cylindrical means for housing a core to the substantial exclusion of drilling fluid, means for cutting a core of a diameter substantially the same as that of the housing means, said cutting means being aligned with and delivering cut-core to said housing means to substantially fill the same, and means comprising sealing elements carried by said inner cylindrical housing means for independently hermetically sealing said housing means while it is substantially filled with cut-core and before withdrwal of the sampler from the drill-hole.

13. A pressure coring device comprising: a core cutter adapted to enter a well and having a circular bore and external cutting members, said core cutter having passages for drilling fluid communicating with said cutting members and isolated from said bore; a core barrel aligned with said bore and having a diameter just large enough to freely receive a cut-core from said bore; said core barrel having an outwardly closing valve at its upper end, a core breaker a substantial distance below its upper end, and a rotary, passaged, valve below said core breaker having its passage initially coadunate with said core barrel and bore to provide for upward passage of cut-core into said core-barrel; a scavenger plug, initially closing the lower end of said bore and adapted to be pushed along said bore, passage, and barrel by a core being cut; means for opening said outwardly closing valve during cutting of a core; and means operable by raising and lowering the core device in the well for effecting closure of said outwardly closing valve, for withdrawing cut core below said core breaker from said rotary valve, and for thereafter rotating said rotary valve to sealing position; whereby the core being cut is substantially isolated from drilling fluid during cutting and sealing, and retains formation conditions substantially unchanged during removal from the well.

14. A pressure coring device comprising a core-cutter adapted to enter a well and having a circular bore and external cutting members, said core-cutter having passages for drilling fluid communicating with said cutting members and isolated from said bore; an inner core-receiving barrel aligned with said bore and having a diameter to just freely receive a cut-core from said bore; a scavenger plug, initially closing the lower end of said bore and adapted to be pushed along said bore and core-receiving barrel by a core being cut, whereby the core being cut is substantially isolated from drilling fluid; and means comprising sealing elements carried by said core-receiving inner barrel and operable while the coring device is in the well for independently hermetically sealing up a section of said inner core-receiving barrel enclosing said scavenger plug and a section of cut-core to maintain the same isolated from drilling fluid and retain formation conditions in the sealed core section during removal from the well.

15. A pressure coring device for cutting and hermetically sealing a sample of formation at the bottom of a drill hole, comprising an outer casing in its entirety rigidly associated with the drill stem, an inner core-receiving barrel housed in the upper portion of said casing, a core cutter and guide reciprocable in the lower portion of said casing and adapted to be rotated by rotation of said casing during cutting of a core and to deliver cut core into said core-barrel to substantially fill the same, and means carried by said inner core-receiving barrel, and operable by reciprocation of said core cutter and guide relative to said core-receiving barrel, for hermetically sealing in said inner core-receiving barrel a portion of cut core housed therein.

16. A pressure coring device for cutting and hermetically sealing a sample of formation at the bottom of a drill hole, comprising an outer casing in its entirety rigidly associated with the drill stem, a core barrel housed in the upper portion of said casing, said core barrel comprising an outwardly closing vent valve at its upper end adapted to be opened during cutting of a core, an initially open positive-displacement sealing means at its lower end, and a core breaker immediately above said sealing means, a core cutter and guide reciprocable in the lower portion of said casing and adapted to be rotated by rotation of said casing during cutting of a core and to deliver cut core through said open sealing means and said core breaker into said core barrel to substantially fill the same, and means operable by reciprocation of said core cutter and guide relative to said core barrel for effecting positive displacement of said sealing means and closing of said vent valve for hermetically sealing in said core barrel a portion of cut core housed therein.

17. A pressure coring device according to claim 16, in which said last named means comprises rack means adapted to be engaged by said cutter and guide during reciprocation of the latter and to be shifted therewith longitudinally relative to said outer casing, and pinion means engaged by said rack for positively displacing said sealing means to closed position.

18. A pressure coring device according to claim 16, in which said positive displacement sealing means comprises a rotary plug valve at the lower end of said core barrel provided with a stem carrying a pinion, and said last named means comprises a sleeve associated with a rack engaged with said pinion and adapted to be raised in said casing to advance said rack and turn said pinion and a means carried by said core cutter and guide which engages said sleeve when said core cutter and guide is reciprocated downwardly relative to said casing and raises said sleeve when said cutter and guide is again raised relative to said casing.

19. A pressure coring device comprising a rigidly unitized outer casing adapted to form a rigid extension of a drill stem, a core cutter and guide in the lower part of said casing adapted to be rotated thereby when retracted inwardly relative to the casing, said cutter and guide adapted to slide outwardly relative to said casing to a projected position relative thereto, a core barrel housed in the upper part of said casing and aligned to receive cut core from said core cutter and guide, means providing for limited reciprocal movement of said barrel longitudinally in said casing, an outwardly closing vent valve at the upper end of said barrel, and means for forcing said valve open when said barrel is raised relative to said casing, an initially open rotary valve at the lower end of said barrel, means engageable by said cutter and guide when the latter is in projected position for turning said rotary valve to closed position, a core breaker in said core barrel immediately above said rotary valve, and releasable means initially holding said cutter and guide in a nearly retracted position in said casing, said cutter and guide, when in fully retracted position, operating to raise said barrel relative to said casing to open said vent valve; whereby lowering of the device to core cutting position opens said vent valve, rotation of said casing in such position cuts core and delivers cut core through said rotary valve and core breaker into said barrel, raising of said casing from core cutting position allows said cutter and guide to move to its projected position withdrawing core underlying said core breaker from said rotary valve, relowering of said casing closes said rotary valve, and raising of said casing allows closure of said outwardly closing vent valve, thereby hermetically sealing said barrel under formation conditions and during its withdrawal from the drill hole.

20. A pressure coring device comprising a rigidly unitized outer casing adapted to form a rigid extension of a drill stem, a core cutter and guide in and reciprocable through the lower end of said casing to retracted and projected positions relative to said casing and adapted to be rotated by said casing when in its retracted position, a hermetically sealable core barrel in the upper part of said casing, releasable means initially holding said core cutter and guide in nearly retracted position relative to said casing, means operable by movement of said cutter and guide from projected to retracted position for hermetically sealing the lower end of said core barrel, and means operable when said cutter and guide is not in its full retracted position for hermetically sealing the upper end of said core barrel against loss of pressure therethrough.

21. In a pressure coring device, a core barrel having a positive displacement core-valve at its lower end and a core-breaker immediately above said valve, and means operable for delivering cut core into said barrel through said valve to substantially fill said barrel and for thereafter retracting cut core outwardly relative to said barrel to withdraw outwardly from said valve that part of the core below said core-breaker to facilitate closing of said valve.

22. In a pressure coring device a combination according to claim 21, in which said last named means is operable to a fully projected position to withdraw the withdrawal core a substantial distance below said valve and comprises means engageable to effect closing of said valve on its movement to and its partial return from its fully projected position.

23. In a pressure coring device, a hermetically sealable core barrel unit comprising a cylindrical member carrying an outwardly closing vent valve at its top end and a rotary spherical core-valve at its bottom end and having a core-breaker immediately above said rotary valve, said cylindrical member, core-breaker, and core-valve defining a cylindrical passage of a diameter to just freely receive cylindrical core sections as cut and be substantially completely filled thereby said vent valve having a valve opening member adapted to be engaged by external means for opening the vent valve, and said rotary valve having a valve closing member adapted to be turned by external means for closing said valve, whereby said element is adapted to be substantially filled with cut core, to retain a substantial filling thereof when the tail of the core below said breaker is withdrawn from said rotary core valve, and to hermetically seal the retained portion of core isolated from any substantial quantity of drilling mud.

24. In a pressure coring device, in combination, a core barrel having a cylindrical body, an outwardly closing vent valve at one end of said body, a positive displacement core sealing valve at the other end of said body and a core-breaker immediately above said last named valve, and a scavenging plug adapted to precede a section of cut core into said body through said core sealing valve when said valves are open, said scavenging plug having a check valved passage opening toward said vent valve; whereby passage of said plug from said core-valve to close approach to said vent valve while the latter is open effects substantially complete scavenging of said core barrel, closing of the two first mentioned valves hermetically seals the contents of said barrel, and forcing open of said vent valve allows fluid contents of said core barrel to escape by way of said check valved passage and said vent valve.

25. In a pressure coring device, a cylindrical core receiving housing, and a scavenging plug snugly fitting said housing and adapted to be engaged by and to precede cut core entering said housing, said scavenging plug having a check valved passage therethrough opening from the core-engaged side thereof toward the scavenging side thereof, whereby fluids may be passed through said scavenging plug in said direction.

HAROLD C. MILLER.
WILLIAM B. BERWALD.
DAVID BEN TALIAFERRO, Jr.

CERTIFICATE OF CORRECTION.

Patent No. 2,364,088.                                         December 5, 1944.

HAROLD C. MILLER, ET AL.

It is hereby certified that error appears in the printed specification of the above numbered patent requiring correction as follows: Page 1, first column, line 1, for the word "This" read --The--; and second column, line 17, for the word "ball" read --ball valve--; page 4, second column, line 54, for the word "designs" read --design--; page 6, second column, line 6, for "cut-bore" read --cut-core--; page 7, first column, line 38, claim 13, for "core" before "device" read --coring--; and that the said Letters Patent should be read with this correction therein that the same may conform to the record of the case in the Patent Office.

Signed and sealed this 20th day of February, A. D. 1945.

Leslie Frazer (Seal)                        Acting Commissioner of Patents.